US008674940B2

(12) United States Patent
Jameson

(10) Patent No.: US 8,674,940 B2
(45) Date of Patent: Mar. 18, 2014

(54) CUSTOM GRIP ASSEMBLY AND METHOD OF USING THE SAME

(76) Inventor: Tim Jameson, Waukee, IA (US)

( * ) Notice: Subject to any disclaimer, the term of this patent is extended or adjusted under 35 U.S.C. 154(b) by 334 days.

(21) Appl. No.: 13/073,046

(22) Filed: Mar. 28, 2011

(65) Prior Publication Data

US 2011/0241992 A1 Oct. 6, 2011

Related U.S. Application Data

(60) Provisional application No. 61/320,046, filed on Apr. 1, 2010.

(51) Int. Cl.
*G06F 3/033* (2013.01)
*G09G 5/08* (2006.01)

(52) U.S. Cl.
USPC .......................................... 345/161; 345/156

(58) Field of Classification Search
USPC ............ 345/156, 157, 161, 168, 169; 341/20; 74/471 XY; 16/430
See application file for complete search history.

(56) References Cited

U.S. PATENT DOCUMENTS

| | | | | |
|---|---|---|---|---|
| 2,876,010 | A | 3/1959 | Hugman | |
| 4,089,070 | A | 5/1978 | Cherry | |
| 4,696,842 | A | 9/1987 | Doubt | |
| 4,765,856 | A | 8/1988 | Doubt | |
| 4,785,495 | A | 11/1988 | Dellis | |
| 5,155,878 | A | 10/1992 | Dellis | |
| 5,555,584 | A | 9/1996 | Moore, III et al. | |
| 5,570,884 | A | 11/1996 | Carps | |
| 5,870,082 | A * | 2/1999 | Selker et al. | 345/168 |
| 6,148,483 | A | 11/2000 | DeGraff | |
| 6,158,910 | A | 12/2000 | Jolly et al. | |
| 6,556,149 | B1 * | 4/2003 | Reimer et al. | 341/20 |
| 6,832,413 | B1 | 12/2004 | Applewhite et al. | |
| 2003/0019316 | A1 * | 1/2003 | Tews | 74/471 XY |
| 2003/0024543 | A1 | 2/2003 | Wolf | |
| 2003/0110585 | A1 | 6/2003 | Rechelbacher | |
| 2003/0123917 | A1 * | 7/2003 | Willat et al. | 401/6 |
| 2004/0217555 | A1 * | 11/2004 | Willat et al. | 277/645 |
| 2005/0197219 | A1 | 9/2005 | Casasanta, Jr. | |
| 2006/0137144 | A1 * | 6/2006 | Tillim et al. | 16/430 |
| 2009/0007387 | A1 | 1/2009 | Laghi | |
| 2010/0195279 | A1 * | 8/2010 | Michael | 361/679.41 |
| 2011/0208000 | A1 * | 8/2011 | Honda et al. | 600/118 |

* cited by examiner

*Primary Examiner* — Ricardo L Osorio
(74) *Attorney, Agent, or Firm* — Zarley Law Firm, P.L.C.

(57) ABSTRACT

A custom grip assembly that includes an attachment member for connection to a joystick assembly. The attachment assembly is made from deformable material that when originally gripped by a user deforms to the custom shape of the user's grip. The deformable material then remains in that shape and hardens to present a permanent grip assembly for the user.

5 Claims, 2 Drawing Sheets

CUSTOM GRIP ASSEMBLY AND METHOD OF USING THE SAME

CROSS REFERENCE TO RELATED APPLICATION

This application claims the benefit of U.S. Provisional Application No. 61/320,046 filed Apr. 1, 2010.

BACKGROUND OF THE INVENTION

This invention is directed toward a grip assembly. More specifically, and without limitation, this invention relates to a custom grip assembly which is formable to a user's hand.

Gripping devices are old and well known in the art. For some time now, manufacturers and users alike have been adding gripping devices to items that are to be held in the user's hand where grip is particularly important. Examples include golf clubs, steering wheels, tennis rackets, joysticks, handle bars, hand tools and the like. These gripping devices generally were in the form of a partially resilient and compressible foam or plastic wrap or tube that was placed over the handle portion of the device to be gripped. Although the partially resilient and compressible nature of these gripping devices made holding onto the hard metal, wood or plastic device more comfortable, problems still exist. For instance, application of the gripping material often was complex and difficult and many times the gripping material unraveled or fell off prematurely. In addition, as the gripping devices were generally one-size-fits-all, they did not provide a grip that was custom formed to the particular user's grip. Therefore these generic systems did not serve spinal applications like disabled or disfigured persons, children, or the like.

To address these problems various custom grip systems were developed to provide a custom grip fitted to a specific user. Although these custom grip systems provided the user with a custom fit grip, many of the same problems remained and new problems arose. For instance, application and formation of the custom grip was complex and difficult and many times the custom gripping material degraded or fell off prematurely or the shape of the custom grip was less than optimal. In addition these custom grips were generally exceedingly expensive and very difficult to remove and replace once worn, degraded or outgrown. Therefore a need exists in the art for a custom grip that addresses these problems.

Thus it is a primary object of the present invention to provide a custom grip assembly and method of using the same that improves upon the prior art.

Another object of the present invention is to provide a custom grip assembly that is economical in nature.

Yet another object of the present invention is to provide a custom grip that is easy to install.

Another object of the present invention is to provide a custom grip that is easily replaced.

These and other objects, features, and advantages of the present invention will become apparent from the specification and claims.

BRIEF SUMMARY OF THE INVENTION

A custom grip assembly that has an attachment member with a connecting member for connection with a joystick assembly. The attachment member is formed from a deformable material such that upon being originally gripped by a user the deformable material deforms into a shape associated with the grip of the user. Once in this deformed state the deformable material then permanently remains in that shape to present a custom made grip.

DETAILED DESCRIPTION OF THE INVENTION

Figure 1:
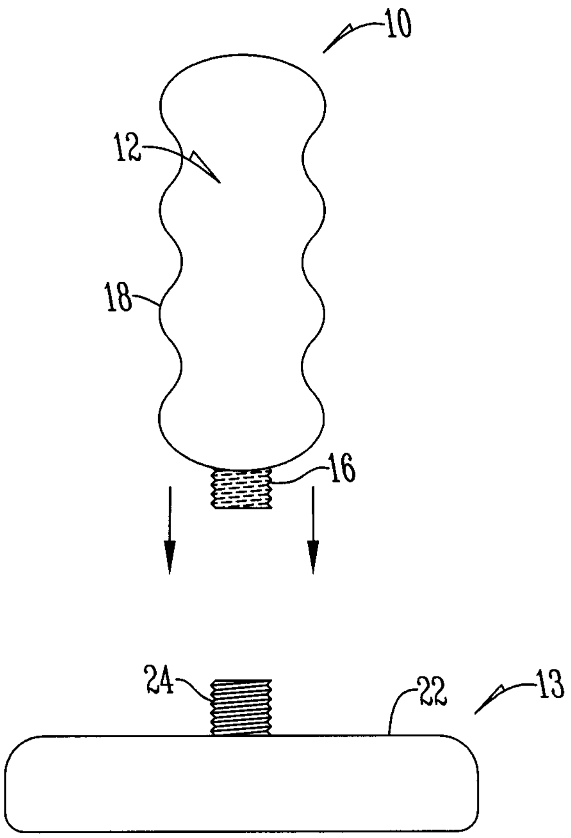
FIG. 1 is a perspective view of a custom grip assembly attached to a mechanical device.
Figure 2:
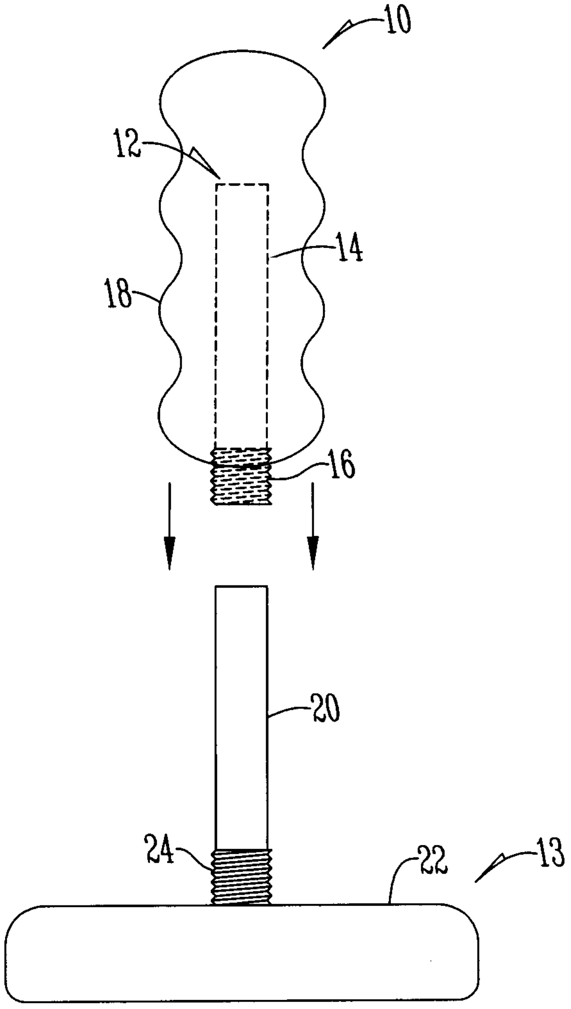
FIG. 2 is a perspective view of a custom grip assembly attached to a mechanical device.

The figure illustrates a custom grip assembly generally referred to as reference numeral 10. In one embodiment the custom grip assembly 10 has an attachment member 12. Attachment member 12 is any device that can be attached to a mechanical device 13. In a preferred embodiment the attachment member is made from a deformable material 18. Deformable material 18 is any material that can be deformed to custom fit a user's hand.

In a preferred embodiment deformable material 18 exists in two states. The first state, the deformable state, deformable material 18 is deformable or partially viscous wherein the deformable material 18 is formable into the shape of a user's custom grip. The second state, the set state, is a harder or more permanent state wherein the deformable material 18 maintains the shape of the user's custom grip. In the second state, or set state, deformable material 18, although set in the shape of the user's custom grip, the deformable material 18 still has some give, resilience or cushion thereto so as to be comfortable to the user's hand and improve gripping. Deformable material 18 is any material such as foam, plastic, rubber, Play-Doh®, composite or the like material.

Preferably, deformable material 18 is transitioned from the first state, the deformable state, to the second state, the set state, by curing. Curing occurs through any process such as exposure over time to air, light, ultra violet light, radiation, heat, chemicals or the like that causes deformable material 18 to harden or set. Alternatively, the opposite process is used, that is the deformable material 18 is exposed to light, ultra violet light, radiation, heat or chemicals to transition deformable material from a set state to a deformable state. Once removed, the deformable material transitions back to a set state. Alternatively, deformable material 18 permanently remains in a partially viscous or deformable state.

In an alternative embodiment, attachment member 12 has an elongated attachment stem 14 that terminates in an connecting member 16 located thereon that aids in the removable and replaceable connection of the attachment member 12 to the mechanical device 13 such as threads, an annular groove, a detent, a snap-fit device, a mechanical locking device, or the like.

In the event that the attachment member 12 is solid the connecting member 16 is located on the outside of the attachment member 12. In the event that the attachment member 12 is hollow, the connecting member 16 is located on the outside surface, the inside surface or both surfaces of the of the attachment member 12.

In this embodiment, located above the connecting member 16 on the outside surface of the attachment member 12 is the deformable material 18. The exterior or outside surface of attachment stem 14 has a roughened or textured surface so as to improve adhesion or connection of deformable material 18 to attachment member 12 such as a sanded surface, a sand blasted surface, a diamond patterned surface or the like. Alternatively an adhesive material such as glue, epoxy, or the like is applied to the exterior surface of attachment member 12 or an adhesion improving paint, oxidation or coating is applied such as grit filled paint, a layer of sprayed metal, an anodized layer or the like is applied to improve adhesion.

In one embodiment, a support rod 20 of the mechanical device receives the hollow attachment member 12 to form a joystick assembly 22. The connecting member 16, a series of internal threads, engages the receiving member 24 of the joystick assembly 22 thereby removably and replaceably attaching the custom grip assembly 10 to the mechanical device 13.

In operation, when the attachment member 12 is made from a deformable material 18, the deformable material 18 is in the first state, or the deformable state. The user forms the deformable material 18 into a custom grip by gripping the deformable material 18 and pressing such that a custom grip is formed. Once the custom grip is formed, the user then cures the deformable material 18 by way of the curing process which may include any one or a combination of exposing the deformable material 10 to air over time, light, ultra violet light, radiation, heat, or curing chemicals. Once the custom grip is set into the deformable material 18, the user attaches the attachment member 12 to the mechanical device 13 by way of a connecting member 16.

When the user wants to replace the custom grip assembly 10, the user removes the custom grip assembly 10 from the mechanical device 13 and repeats this process. In this way a custom grip assembly 10 is removably and replaceably applied to mechanical device 13 thereby allowing a plurality of users to use the same mechanical device 13 each with a custom grip 10.

In another embodiment, the user is supplied with a mass of deformable material 18 which the user applies to the attachment member 12 in the places and amounts desired. In one embodiment, as supplied, the mass of deformable material 18 resembles a ball of deformable dough. The user applies deformable material 18 to the exterior surface of a attachment member 12, and particularly on the attachment stem 14. The user works deformable material 18 into the roughened surface of attachment stem 14 thereby improving adhesion between the deformable material 18 and the attachment member 12. In addition, an adhesive material is applied at the interface of the attachment member 12 and the deformable material 18 so as to improve adhesion therebetween.

Once the deformable material 18 is applied to the attachment member 12 the user creates a custom grip, as described above. Through the use of deformable material 18 and attachment members 12 a plurality of custom grips can be formed and can be removably replaced so as to conform to a plurality of users, or to accommodate growing kids or patients with ever-changing conditions.

Accordingly, the custom grip assembly 10 presented is easily formed, is economic in nature and is easily removed and replaced and therefore the custom grip assembly offers many advantages over the prior art.

It will be appreciated by those skilled in the art that other various modifications could be made to the device without parting from the spirit and scope of this invention. All such modifications and changes fall within the scope of the claims and are intended to be covered thereby.

What is claimed is:

1. A custom grip assembly comprising:

an attachment member connected to a joystick assembly; and said attachment member formed by an elongated stem having an outer roughened outer surface that terminates in a connecting member surrounded by a deformable material that upon being originally gripped by a user deforms into a shape associated with the grip of the user and permanently remains in that shape.

2. The assembly of claim 1 wherein the deformable material permanently remains in the shape associated with the grip of the user by curing.

3. The assembly of claim 1 wherein the deformable material is selected from the group consisting of foam, plastic, rubber, Play-Doh®, and composite.

4. The grip assembly of claim 1 further comprising an adhesive material applied at the interface of the stem and the deformable material.

5. The grip assembly of claim 1 wherein the connecting member is located on the inside surface of the stem.

* * * * *